Jan. 4, 1966    P. E. MacMILLAN    3,227,025
MITERING TOOL
Filed Oct. 2, 1963    2 Sheets-Sheet 1
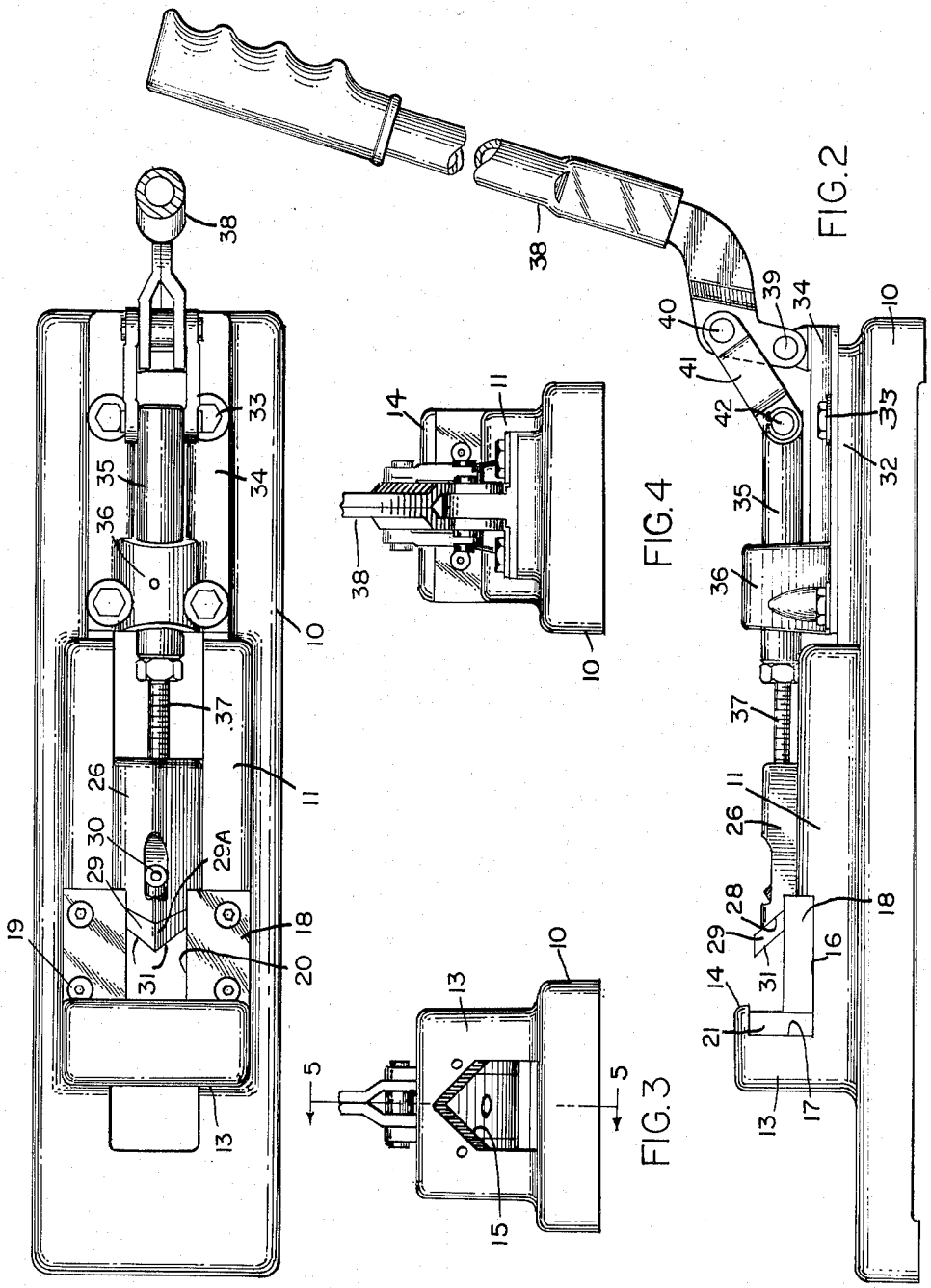
INVENTOR.
PAUL E. MAC MILLAN
BY
ATTORNEY Jan. 4, 1966 P. E. MacMILLAN 3,227,025
MITERING TOOL
Filed Oct. 2, 1963 2 Sheets-Sheet 2
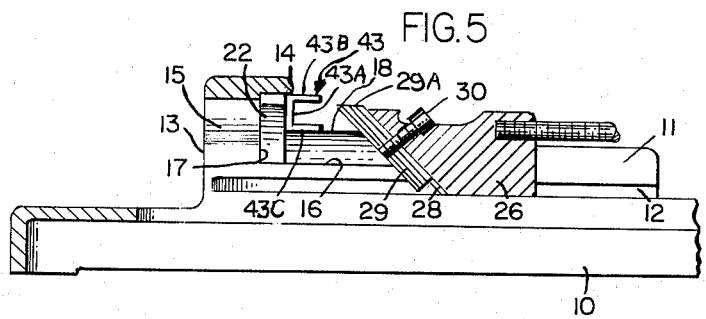
FIG.5
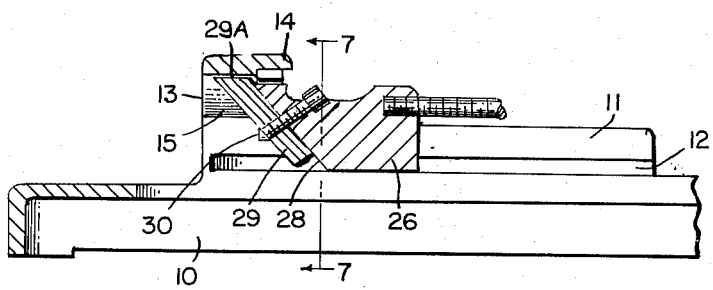
FIG.6
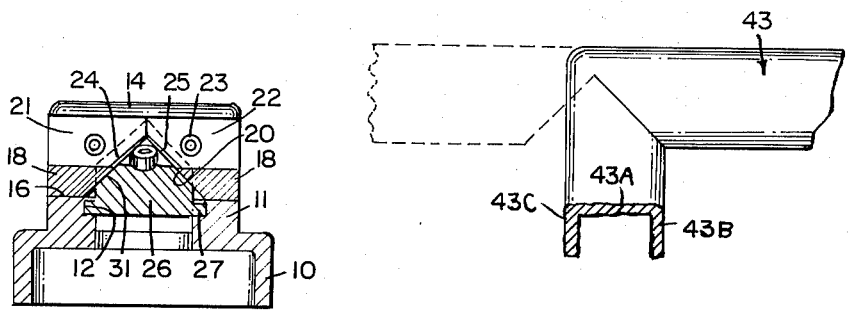
FIG.7
FIG.8
INVENTOR.
PAUL E. MAC MILLAN
BY
ATTORNEY

United States Patent Office 3,227,025
Patented Jan. 4, 1966

3,227,025
MITERING TOOL
Paul E. MacMillan, 161 Willow Ave., Somerville, Mass.
Filed Oct. 2, 1963, Ser. No. 313,333
4 Claims. (Cl. 83—581)

The present invention relates to a tool for use in forming mitered joints in metal and plastic trim and other strips that are to extend around corners.

In finishing the interiors of buildings, for example, substantial amounts of trim are used. Such trim comes in substantial lengths and a common type also functions as a cover and permits at least two and usually three surfaces that extend lengthwise of the strip and are joined to lie at an angle relative to each other.

When such strips are to extend around a corner, mitered joints are required and the practice is for the workman to cut these with shears by eye. This operation takes considerable time and the resulting joints were, more often than not, objectionable in appearance.

The principal objective of the present invention is the provision of a tool for mitering joints in strips of the above referred to type requiring only that the strip be positioned in the tool and the tool operated to so cut the strip that it may be then bent into a predetermined angular relationship. In accordance with the invention, this objective is attained; a mitering tool has a base establishing a longitudinal way bordered by parallel, co-planar cutting edges, one at each side of the way, and upwardly disposed cutting edges in the form of an inverted V each of whose ends registers with an appropriate one of the parallel cutting edges. A head, slidable in the way, has a cutter provided with cutting edges in the form of an inverted V of the size and shape established by the cutting edges of the base.

A specific objective of the invention is to provide maximum ease and efficiency of operation in cutting the strips. This objective is attained by having the cutting edges of the head disposed at an angle relative both to the parallel cutting edges and to the upwardly disposed cutting edges of the base.

Yet another objective of the invention is to provide a joint mitering tool for use with strips of different sizes and shapes, an objective attained by providing for the removal and replacement of the cutting edges including both those that are fixed on the base and those movable relative thereto.

In the accompanying drawings, there is shown an illustrative embodiment of the invention from which these and other of its objectives, novel features, and advantages will be apparent.

In the drawings:

FIGURE 1 is a top plan view of a joint-mitering tool in accordance with the invention, FIGURE 2 is a side view thereof, FIGURE 3 is a view of the bridge and of the tool, FIGURE 4 is a view of the handle end thereof, FIGURE 5 is a section of the bridge end of the tool taken approximately along the indicated lines 5—5 of FIGURE 3, with the cutting head in its retracted position, FIGURE 6 is a like view but with the cutting head fully advanced, FIGURE 7 is a section taken approximately along the indicated lines 7—7 of FIGURE 6, and FIGURE 8 is a plan view of a mitered strip.

The mitering tool shown in the drawings consists of a base 10 provided with spaced parallel sides 11 having transversely alined horizontal ways 12 extending forwardly under a bridge 13 provided with a rearwardly disposed overhang or shoulder 14. The bridge 13 is shown as having its passage 15 in the form of an inverted V. Each side 11 has a horizontal seat 16 adjacent the bridge 13 and the proximate or rearward face of the bridge 13 is a vertical seat 17.

Members 18 are provided, one for each seat 16 and attached thereto as by screws 19. Each member 18 has a bevelled cutting edge 20 overhanging the space between the sides 11 and the cutting edges 20 are spaced and parallel. Members 21 and 22, see FIGURE 7, are secured to the vertical seat 17 as by screws 23 and these have bevelled cutting edges 24 and 25, respectively, defining an inverted V, each cutting edge being in registering alinement with the cutting edge 20 of one of the members 18 at the forward end thereof. It will be noted that the cutting edges 24 and 25 are spaced inwardly of the edges of the bridge passage 15. The members 18, 21, and 22 may, accordingly be replaced by corresponding members so dimensioned that their cutting edges define larger as well as smaller inverted V's and such replacements may be quickly and easily made.

A head 26 has ribs 27 slidably entrant of the ways 12 and is shown as having its forward end in the form of a rearwardly and downwardly inclined seat 28 against which a member 29 is clamped by a screw 30 extending forwardy and downwardly through the head 26 and threaded into the member 29. The member 29 has its apex 29A horizontal and its cutting edges 31 are downwardly and rearwardly inclined. The cutting edges 31 define an inverted V of such a size and shape as to coact with the cutting edges 20, 24, and 25.

While the head 26 may be reciprocated between its rearward position and its forward position, in which it is housed by the bridge 13, by any suitable means, either manually or power operated, the base 10 is shown as having a mount 32 rearwardly of its sides 11. Secured to the mount 32 as by bolts 33 is the bed 34 having a horizontal stem 35 slidably supported in a housing 36 and connected to the head 26 by the threaded member 37.

A handle 38 is connected to the bed 34 by a pivot 39 above which there is a pivot 40 connecting corresponding ends of links 41 to the handle with the other ends of the links 41 being connected to the rear end of the stem 35 by a pivot 42.

While other types of trim may be mitered with a tool in accordance with the invention, trim 43 is shown. The trim 43 is shown as having a central wall 43A and marginal walls 43B and 43C disposed at right angles thereto. The trim is inserted in the tool, with the head 26 retracted, with the wall 43A seated against the members 21 and 22, the wall 43B caught under the shoulder 14, and the wall 43C seated against the members 18. It will be noted, see FIGURE 7, that the apex of the V defined by the cutting edges 24 and 25 is spaced below the shoulder 14.

When the handle 38 is swung forwardly, the head 26 is advanced and the wall 43C is cut, along parallel lines, by the shearing action of the downwardly and rearwardly inclined, forwardly moving cutting edges 31 relative to the cutting edges 20. As the head 26 moves forwardly, the apex of the cutting edges 21 pierce the wall 43A and the cutting edges 31 inclined downwardly and rearwardly with respect to the cutting edges 24 and 25 shear a "V" from the wall 43A.

The thus mitered strip 43 may then be bent into the desired angular relationship, usually right angular, with the resulting joint being accurately, quickly and neatly formed. With members corresponding to but thinner than the members 18, strips having a wall correspondingly of greater width than the wall 43A can be accommodated, while with members thicker than the members 18, correspondingly smaller strips can be held between the shoulder 14 and the surface established by the members 18.

I claim:

1. In a device for cutting a strip between its ends to provide a mitered joint when the strip is folded, said strip including at least two angularly joined lengthwise portions, a base including a pair of spaced side portions providing a way and flat, co-planar, elongated seats, said base also including a bridge at one end bridging said side portions and provided with a seat having a transverse plane surface at right angles to said co-planar seats, and a head reciprocally supported by said way and including a cutting member including cutting edges in the form of an inverted V, the plane of said cutting edges being transverse with respect to said co-planar seats and upwardly inclined towards said bridge seat, elongated cutting members, one for each of said co-planar seats and secured thereto, the elongated cutting members having cutting edges inclined upwardly towards each other and disposed to coact with the lower portions of the cutting edges of the cutting member on the head, and cutting means secured to said bridge seat and including cutting edges in the form of an inverted V shaped and disposed to coact with the remaining portions of the cutting edge of the cutting member on the head.

2. The device of claim 1 in which the cutting means consists of two sections having edges that abut at the apex of the cutting edges thereof, each section also has an edge abutting an appropriate one of the co-planar seats, a separate means attaches each section to the bridge seat.

3. The device of claim 1 in which the cutting means consists of two sections having edges that abut at the apex of the cutting edges thereof, each section also has an edge abutting an appropriate one of the co-planar seats, a separate means attaches each section to the bridge seat and each of the elongated cutting members butts against an appropriate one of the sections.

4. The device of claim 1 in which the head has a seat establishing the plane of the cutting member of the head, the cutting member of the head has parallel surfaces, and a screw extends forwardly and downwardly through the seat at right angles to the plane thereof and is threaded into the cutting member of the head.

References Cited by the Examiner
UNITED STATES PATENTS

| | | | |
|---|---|---|---|
| 1,117,577 | 11/1914 | Johnson | 83—581 X |
| 2,837,160 | 6/1958 | Vera | 83—692 X |
| 3,065,657 | 11/1962 | Thompson | 83—581 X |
| 3,097,684 | 6/1963 | Le Tarte | 83—581 X |

WILLIAM W. DYER, JR., *Primary Examiner.*

ANDREW R. JUHASZ, *Examiner.*